(12) United States Patent
Varonis (10) Patent No.: US 7,493,831 B2
(45) Date of Patent: Feb. 24, 2009

(54) IN-BEARING TORQUE SENSOR ASSEMBLY (75) Inventor: Orestes J. Varonis, North Canton, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/517,358

(22) PCT Filed: May 29, 2003

(86) PCT No.: PCT/US03/16850

§ 371 (c)(1),
(2), (4) Date: Jan. 19, 2006

(87) PCT Pub. No.: WO03/102524

PCT Pub. Date: Dec. 11, 2003

(65) Prior Publication Data

US 2006/0169062 A1 Aug. 3, 2006

Related U.S. Application Data (60) Provisional application No. 60/383,945, filed on May 29, 2002.

(51) Int. Cl.
*G01L 3/02* (2006.01)
(52) U.S. Cl. ................................. 73/862.333
(58) Field of Classification Search .....................
73/862.331–862.338
See application file for complete search history.

(56) References Cited

U.S. PATENT DOCUMENTS 2,365,073 A  12/1944  Haight
2,438,288 A *  3/1948  Jacobson et al. ............ 318/606
2,912,642 A  11/1959  Dahle
3,664,473 A *  5/1972  Hendershot et al. ........ 192/21.5

(Continued)

FOREIGN PATENT DOCUMENTS

DE  3437379  4/1985

(Continued)

OTHER PUBLICATIONS

English translation of Patent Abstracts of Japan, Publication No. 2001033322, Feb. 9, 2001.

*Primary Examiner*—Harshad Patel
*Assistant Examiner*—Octavia Davis
(74) *Attorney, Agent, or Firm*—Polster, Lieder, Woodruff & Lucchesi, L.C.

(57) ABSTRACT

The present disclosure provides a device for sensing a torque applied through a shaft (18). The device includes a shaft (18) and a bearing (40) attached to the shaft (18). The bearing (40) includes an inner race (44), an outer race (42) and a plurality of rolling elements (46). A magnetoelastic ring (24) is press-fit onto the inner race (44). An eddy current or a magnetic field sensor (30) is placed in close proximity to the magnetoelastic ring (24). In the case of an eddy current sensor (30), the magnetoelastic ring (24) is not magnetized. In the case of a magnetic field sensor (30), the magnetoelastic ring (24) is magnetically circularly polarized. In either case, the chosen sensor (30) senses the induced changes of the magnetoelastic ring (24) characteristics and its associated electronics provides a measure of the applied torque.

29 Claims, 12 Drawing Sheets

U.S. PATENT DOCUMENTS

| | | | |
|---|---|---|---|
| 4,306,462 A | 12/1981 | Meixner | |
| 4,364,278 A | 12/1982 | Horter et al. | |
| 4,479,390 A | 10/1984 | Meixner | |
| 4,503,714 A | 3/1985 | Winterhoff | |
| 4,506,554 A | 3/1985 | Blomkvist et al. | |
| 4,589,290 A | 5/1986 | Sugiyama et al. | |
| 4,873,874 A | 10/1989 | Sobel | |
| 4,876,899 A | 10/1989 | Strott et al. | |
| 4,881,414 A | 11/1989 | Setaka et al. | |
| 4,882,936 A * | 11/1989 | Garshelis | 73/862.333 |
| 4,920,809 A | 5/1990 | Yoshimura et al. | |
| 5,018,393 A | 5/1991 | Seegers | |
| 5,052,232 A * | 10/1991 | Garshelis | 73/862.336 |
| 5,062,062 A * | 10/1991 | Nishibe et al. | 702/41 |
| 5,107,711 A | 4/1992 | Aoki et al. | |
| 5,115,685 A * | 5/1992 | Jorgensen et al. | 73/862.331 |
| 5,146,790 A * | 9/1992 | Fish | 73/862.336 |
| 5,255,567 A | 10/1993 | Miyake et al. | |
| 5,307,690 A | 5/1994 | Hanazawa | |
| 5,323,659 A | 6/1994 | Wakamiya et al. | |
| 5,351,555 A | 10/1994 | Garshelis | |
| 5,386,733 A * | 2/1995 | Hesthamar et al. | 73/862.333 |
| 5,465,627 A | 11/1995 | Garshelis | |
| 5,520,059 A | 5/1996 | Garshelis | |
| 5,526,704 A | 6/1996 | Hoshina et al. | |
| 5,664,638 A | 9/1997 | Padula | |
| 5,708,216 A | 1/1998 | Garshelis | |
| 5,817,952 A * | 10/1998 | Swisher et al. | 73/862.335 |
| 6,098,468 A | 8/2000 | Mohri et al. | |
| 6,237,428 B1 | 5/2001 | Odachi et al. | |
| 6,260,422 B1 | 7/2001 | Odachi et al. | |
| 6,289,748 B1 | 9/2001 | Lin et al. | |
| 6,370,967 B1 | 4/2002 | Kouketsu et al. | |
| 6,490,934 B2 * | 12/2002 | Garshelis | 73/862.336 |
| 6,553,847 B2 * | 4/2003 | Garshelis | 73/862.336 |
| 6,581,480 B1 * | 6/2003 | May et al. | 73/862.333 |
| 6,871,553 B2 * | 3/2005 | Naidu et al. | 73/862.331 |
| 6,997,065 B2 * | 2/2006 | May | 73/862.331 |
| 7,143,656 B2 * | 12/2006 | Wan et al. | 73/862.331 |
| 2001/0029791 A1 | 10/2001 | Sezaki | |

FOREIGN PATENT DOCUMENTS

| | | |
|---|---|---|
| DE | 10117724 | 10/2002 |

* cited by examiner

IN-BEARING TORQUE SENSOR ASSEMBLY

CROSS-REFERENCE TO RELATED APPLICATIONS

The present application claims priority to U.S. Patent Provisional Patent Application Ser. No. 60/383,945 filed May 29, 2002 entitled In-Bearing Torque Sensor Assembly, the contents of which are incorporated herein by reference.

TECHNICAL FIELD

In the past it has been known that the magnetic permeability of ferromagnetic materials changes when stress is applied to the material. Such a property of a material is referred to as magnetostriction. In addition, induced stress on a conductive material alters its electrical conductivity. Taking advantage of these two properties, eddy current devices have been built that sense changes in the electrical conductivity and magnetic permeability of a magnetoelastic ring press-fitted onto a shaft in order to determine the torque that the shaft is under. Shaft torque has also been measured using magnetic field sensors such as Hall and Magnetoresistive sensors and circularly polarized magnetoelastic rings press-fitted onto the shaft OD surface. As torque is transmitted through the shaft, the circular polarization of the magnetoelastic ring changes to an elliptical polarization that is detected by the magnetic field sensor placed at close proximity to the magnetoelastic ring. Thus, detection of the torque-induced elliptical polarization leads to shaft torque measurement. The present invention incorporates the above-mentioned torque measuring techniques in a unique way to measure the torque that is applied to a given shaft. A bearing that comprises of an inner race, an outer race and a plurality of rolling elements is press-fitted onto a shaft and a magnetoelastic ring is press-fitted onto the bearing inner race. As torque is transmitted through the shaft, it alters the magnetoelastic ring characteristics and a sensor in close proximity to the magnetoelastic ring measures the torque-induced changes and provides a measure of the applied torque. If an eddy current sensor is implemented, the press-fitted magnetoelastic ring is not magnetized and the sensor measures the induced changes of its magnetic permeability and electrical conductivity values, and its associated electronics provide a measured of the applied torque. If a magnetic sensor is implemented, the press-fitted magnetoelastic ring is magnetically circularly polarized and the sensor measures the magnetoelastic ring induced elliptical polarization, and its associated electronics provide a measure of the applied torque.

SUMMARY OF THE INVENTION

The present invention comprises a device for sensing a torque applied through a shaft. The device comprises a shaft and a bearing attached to the shaft. The bearing comprises an inner race, an outer race and a plurality of rolling elements. A magnetoelastic ring is press-fit onto the inner race. An eddy current or a magnetic field sensor is placed in close proximity to the magnetoelastic ring. In the case of an eddy current sensor, the magnetoelastic ring is not magnetized. In the case of a magnetic field sensor, the magnetoelastic ring is magnetically circularly polarized. In either case, the chosen sensor senses the induced changes of the magnetoelastic ring characteristics and its associated electronics provides a measure of the applied torque.

BEST MODE FOR CARRYING OUT THE INVENTION

While the invention is susceptible of embodiment in many different forms, there is shown in the drawings and described in detail preferred embodiments of the invention. It is to be understood that the present disclosure is to be considered only as an example of the principles of the invention. This disclosure is not intended to limit the broad aspect of the invention to the illustrated embodiments. The scope of protection should only be limited by the accompanying claims.

Figure 1:
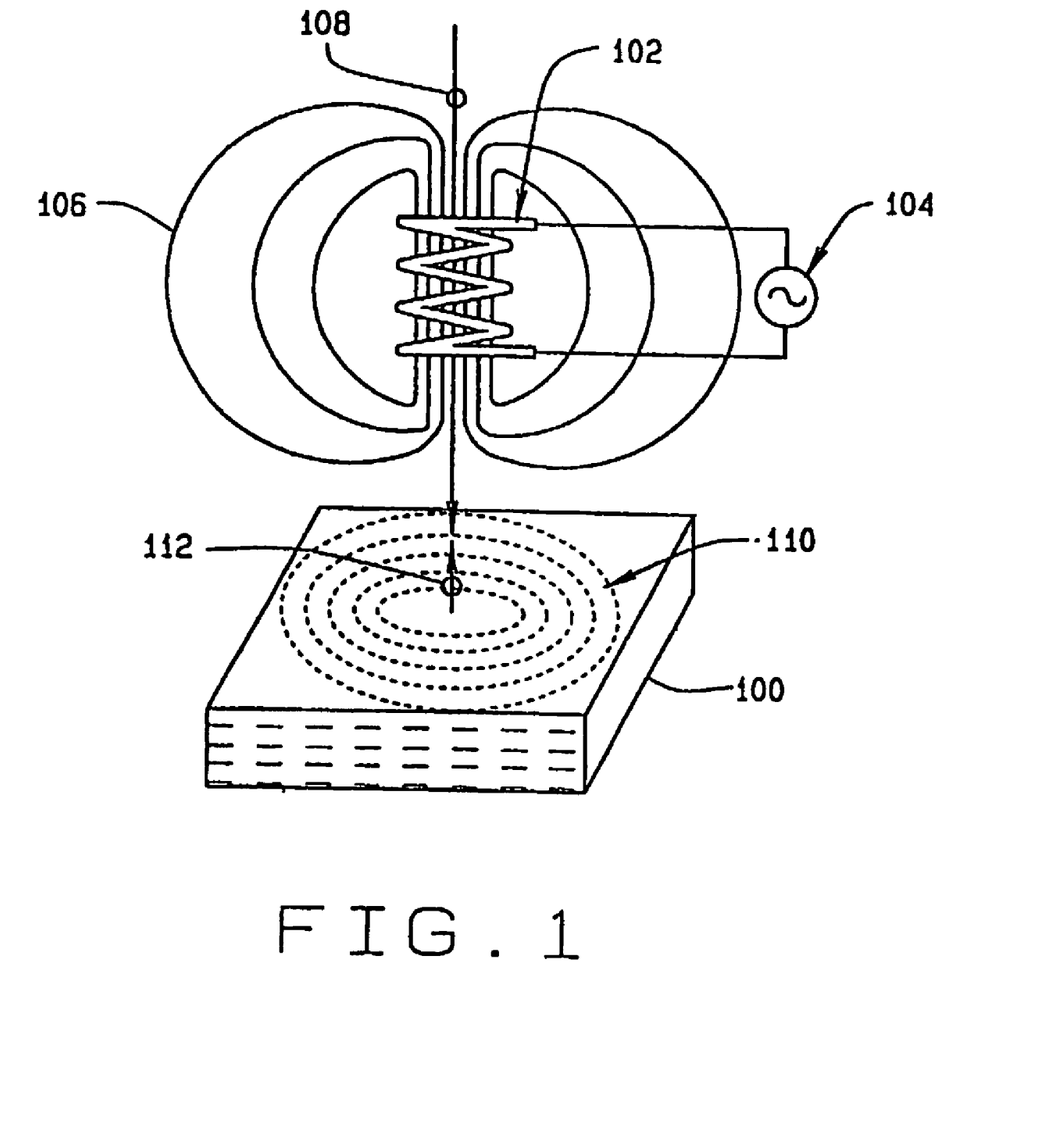
FIG. 1 is a schematic showing the generation of eddy currents inside a conductive material.
Figure 3:
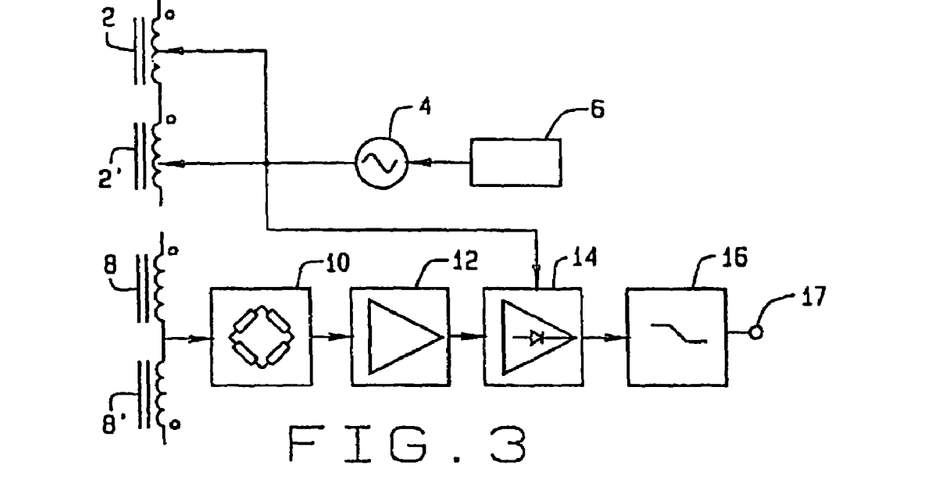
FIG. 3 is an electrical schematic of a differential eddy current sensor according to another embodiment of the present invention.

Referring to FIG. 1, the electrical conductivity (σ) of a given material provides a measure of how easily electrical currents flow through the material. Its magnetic permeability (μ) provides a measure of how easily magnetic flux lines permeate through the material. These two parameters determine the way a given material interacts with electric and magnetic fields. When a piece of material 100 is exposed to an excitation coil 102 powered by an oscillator 104, magnetic flux (represented by magnetic flux lines 106) is created around the coil 102 and a magnetic field 108 is applied to the material 100. The magnetic field 108 induces eddy currents 110 in the material which create an opposing magnetic field 112. Eddy currents (EC) are circulating currents in conductive materials that are produced as a result of time-varying magnetic flux passing through the material. Therefore, ECs are induced inside a conductive material that is near an electrical coil powered by an AC current. The EC generation is due to the interaction of the material's conductive electrons and the AC magnetic field that is generated around the coil by the current through it and depends on the material's electrical conductivity and magnetic permeability. Referring to FIG. 3, when a ferromagnetic material, such as a steel shaft, is under torque, the material's electrical conductivity and magnetic permeability are changed in relation to the amount of torque across the material. By sensing the change in electrical conductivity and magnetic permeability, one can determine the amount of torque being applied through the shaft.

Figure 2:
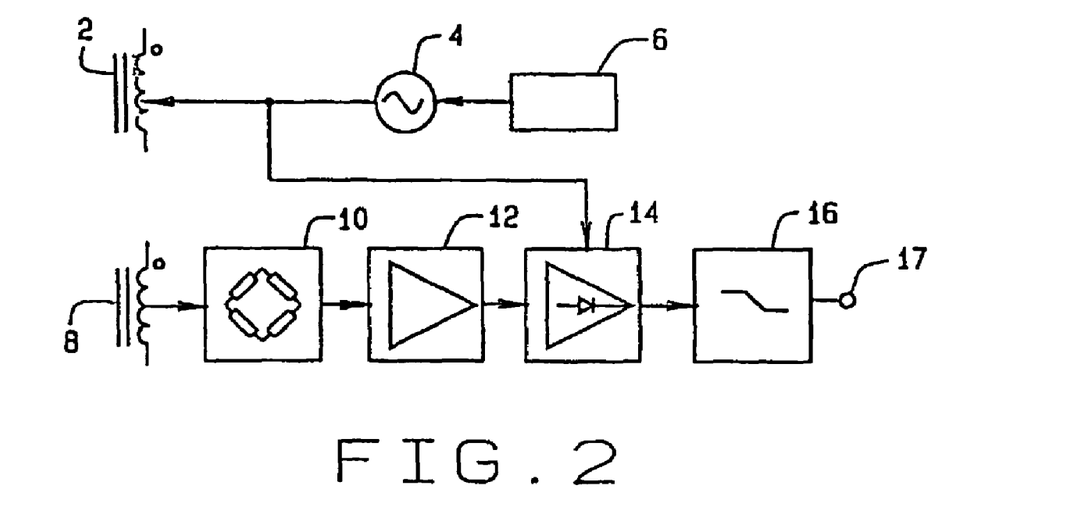
FIG. 2 is an electrical schematic of an absolute eddy current sensor according to one embodiment of the present invention.

Referring to FIG. 2, an absolute EC sensor 1 consists of an excitation coil 2 driven by an oscillator 4 powered by a power source 6 that, when energized, induces eddy currents inside any conductive material at close proximity to it. A sensing coil 8 senses the magnetic field generated by the induced electrical currents inside the conductive material. The current generated in the sensing coil 8 by the sensed magnetic field is supplied to a bridge balancing circuit 10, an amplifier 12, a demodulator 14 and a filter 16 to create a sensor output 17. The generated magnetic field is determined by the path and strength of the eddy current flow, which in turn depends on the material geometry and its σ and μ local values. Thus, absolute EC sensors 1 with a single excitation/sensing element pair have been successfully used for characterization of conductive materials.

Referring to FIG. 3, a differential EC sensor has two excitation/sensing element pairs and is used primarily for the detection of small-localized metallurgical or geometrical anomalies of conductive components. FIG. 3 shows such a sensor that is similar to that of FIG. 2 but adding a second excitation element 2' and a second sensing element 8'. The excitation elements 2 and 2' of a differential EC sensor generate magnetic fields that have approximately the same amplitude and phase. However, its sensing elements 8 and 8' generate signals of approximately equal amplitude but have opposite phase.

Figure 4:
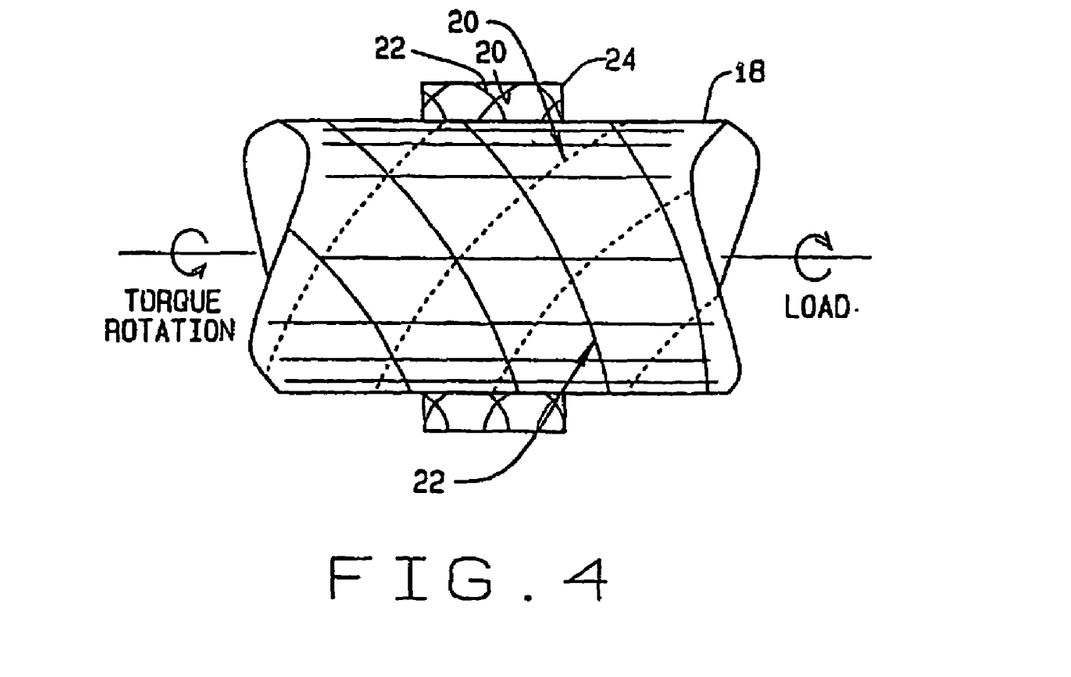
FIG. 4 is a side view of a shaft under torque indicating lines of compression and tension within the shaft.

Referring to FIG. 4, torque transmitted through a shaft 18 generates a shear stress throughout the shaft 18 that varies from zero at its center to a maximum value at its surface. Lines of tension 20 and lines of compression 22 are formed along the shaft 18 as a result of the applied torque. These torque-induced tension and compression lines 20, 22 are normal to each other and are formed at ±45° from the axis of symmetry. A magnetoelastic ring 24 that is press-fitted onto the shaft 18 would also experience the generated shear stress, and lines of tension 20 and lines of compression 22 are formed in the ring 24 as well.

Figure 5:
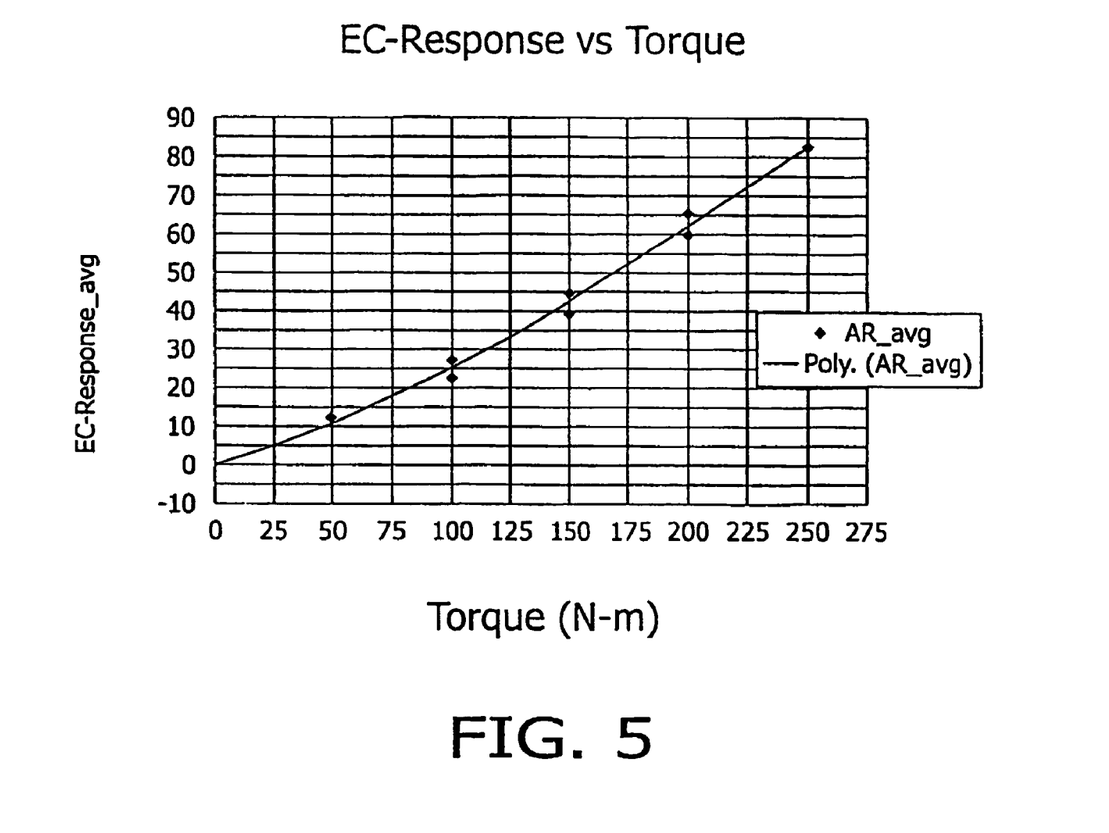
FIG. 5 is a plot of an eddy current sensor output as a function of the shaft carrying torque according to one embodiment of the present invention.
Figure 6:
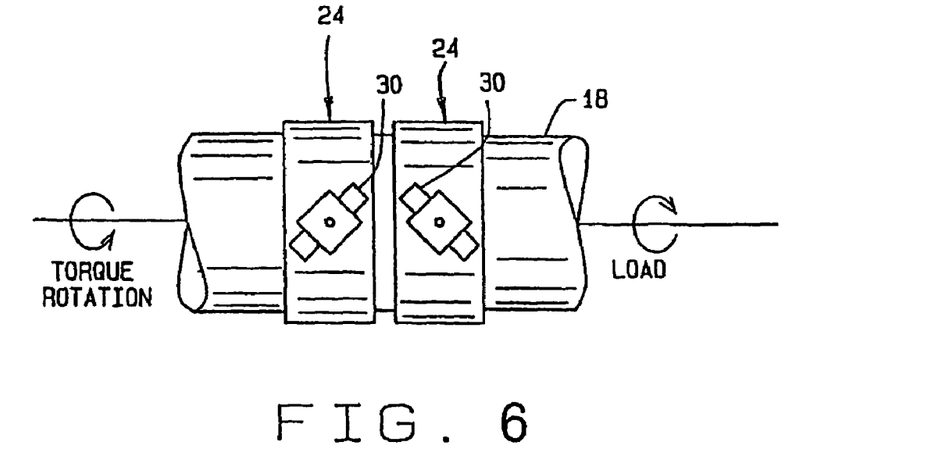
FIG. 6 is a side view of a shaft with eddy current sensors according to another embodiment of the present invention.

The electrical conductivity (σ) and the magnetic permeability (μ) values of the magnetoelastic ring 24 are altered by the generated shear stress with the values being different along the lines of tension from those along the lines of compression (i.e. $\sigma_{tension} \neq \sigma_{compression}$ and $\mu_{tension} \neq \mu_{compression}$). Thus, a differential EC sensor placed over a pair of magnetoelastic rings 24 so that one of its excitation/sensing element pairs focuses along the lines of tension and the other excitation/sensing element pair focuses along the lines of compression (FIG. 6), would sense the local value difference of σ and μ along the magnetoelastic ring and would provide a measure of the applied shaft torque. The relationship of eddy current response to axle torque is a generally linear relationship (see FIG. 5).

Figure 7:
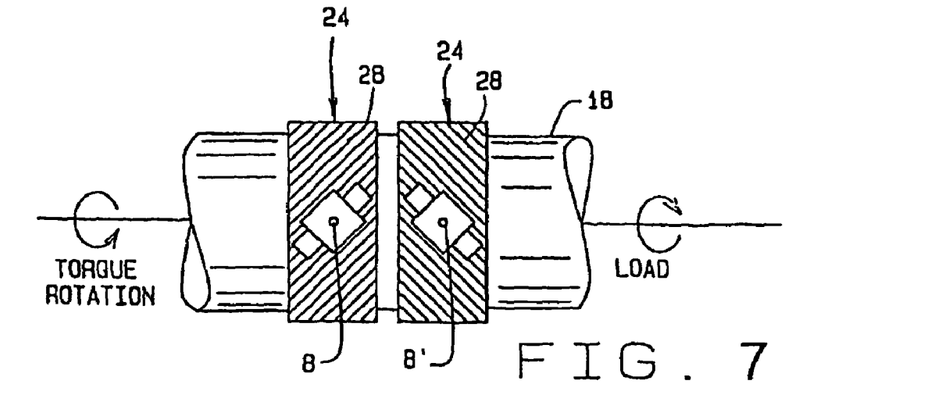
FIG. 7 is a side view of a shaft with eddy current sensors according to another embodiment of the present invention.

Referring to FIG. 7, in certain applications where high torque-sensitivity is required, knurled grooves 28 can be placed on the press-fitted magnetoelastic rings over the outside diameter surface in order to increase the EC sensor response. Under this configuration, the sensor excitation/sensing element pair that focuses on the lines of tension has knurl grooves that are placed parallel to the direction of lines of tension. In the same way, the magnetoelastic ring where the sensor excitation/sensing element pair focuses on the lines of compression has knurl grooves that are placed parallel to the direction of lines of compression.

Figure 8:
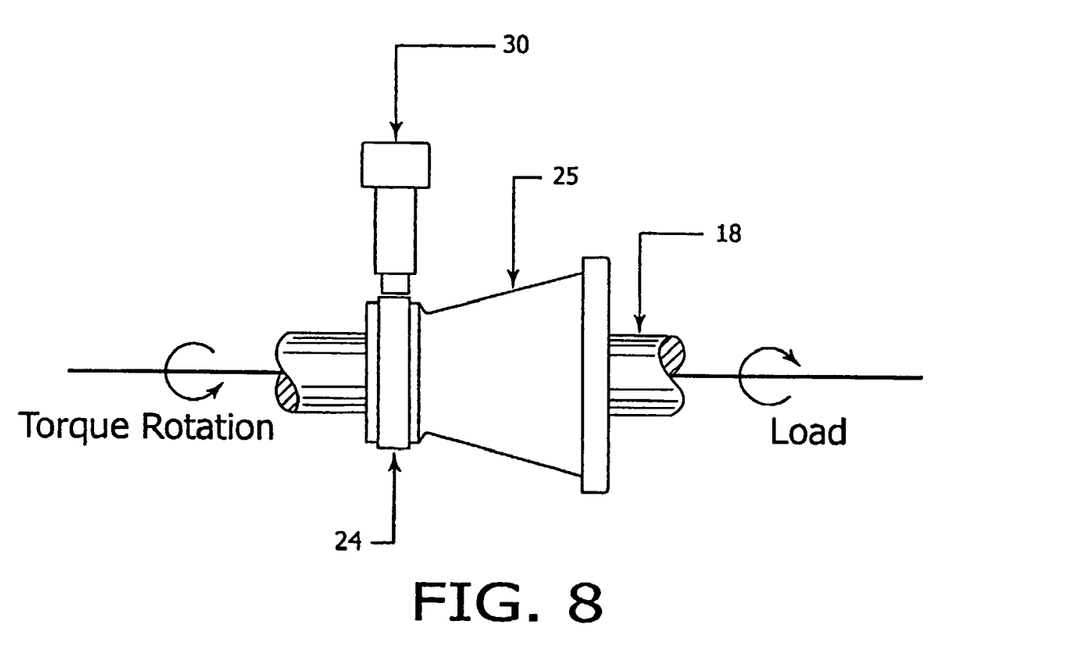
FIG. 8 is a side view of a bearing with an eddy current sensor according to an embodiment of the present invention.

The EC sensors of the present invention may be implemented in a torque sensor that detects torque by sensing ECs induced in a bearing cone pressed onto a shaft. Referring to FIG. 8, the simplest embodiment involves attaching a single excitation/sensing element-pair EC sensor 30 along with its associated electronics to a fixed position adjacent a bearing cone 25 that comprises a magnetoelastic ring 24 that has been pressed onto the rotating shaft 18. In this configuration, loads or moments acting upon the torque-carrying shaft could affect the EC sensor output and thus, this type of assembly is recommended for shaft applications that carry only pure torque. Here, the shaft could have any type of shape, size, and alloy composition and have been made by any given manufacturing process.

Figure 9A:
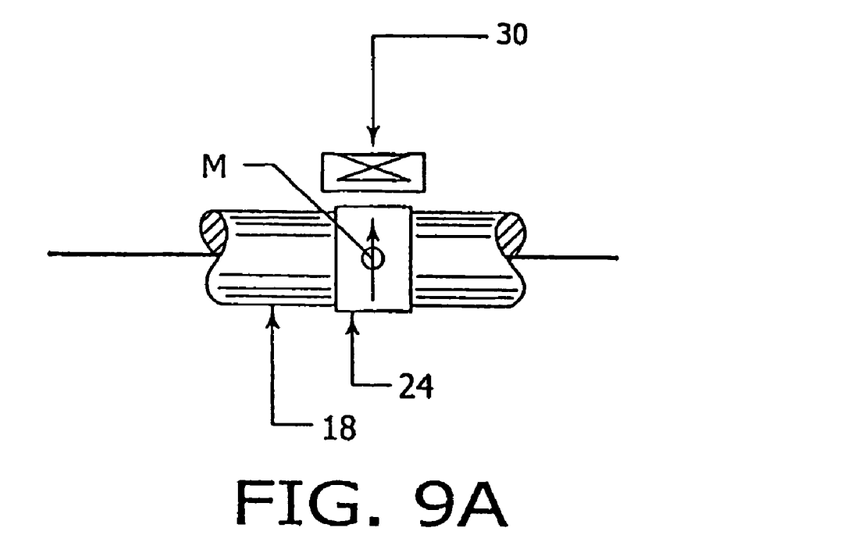
FIGS. 9A and 9B are side views of a shaft having a circularly polarized magnetoelastic ring press fit onto its outer diameter, a magnetic field sensor at close proximity to the magnetoelastic ring, and the generation and detection of the induced elliptical polarization due to the applied shaft torque according to an embodiment of the present invention.
Figure 9B:
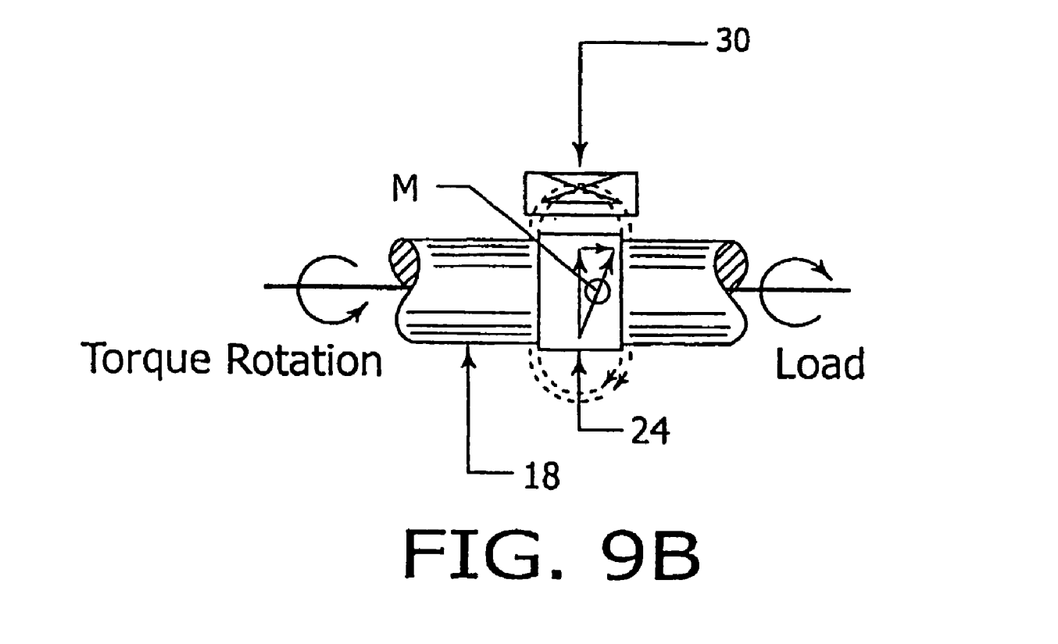
Figure 10A:
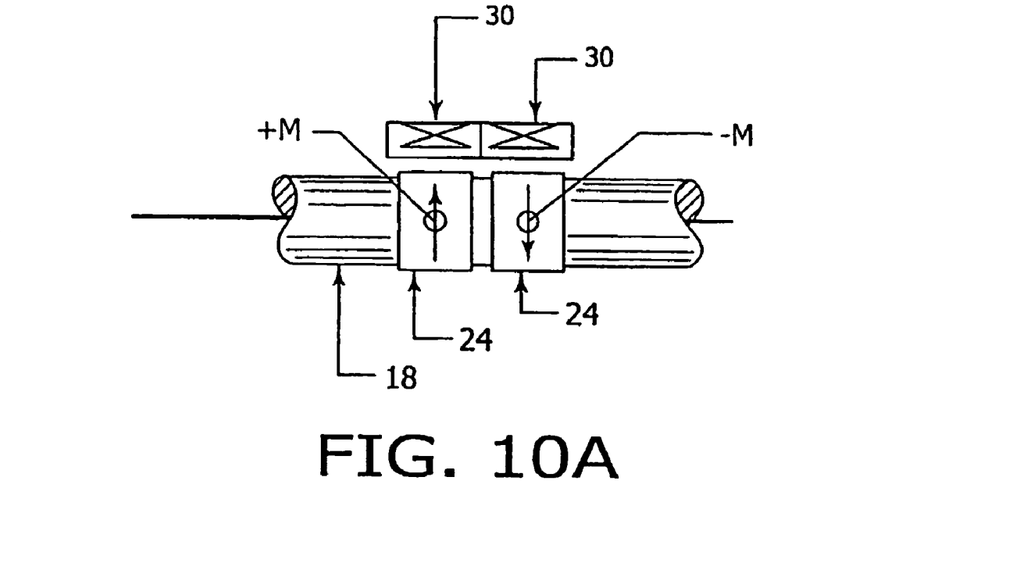
FIGS. 10A and 10B are side views of a shaft having a pair of circularly polarized magnetoelastic rings press fit onto its outer diameter, a pair of magnetic field sensors at close proximity to the magnetoelastic ring pair, and the generation and detection of the induced elliptical polarizations due to the applied shaft torque according to an embodiment of the present invention.
Figure 10B:
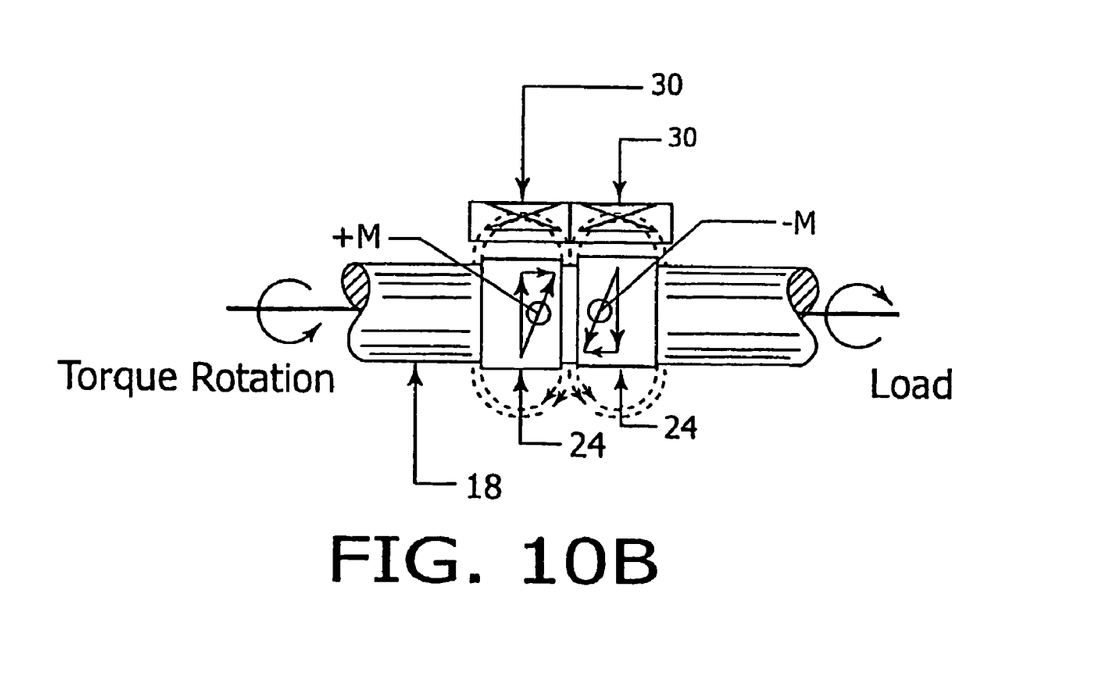

Referring to FIG. 9A, a magnetoelastic circularly polarized ring 24 that is press-fitted onto a bearing cone assembly (not shown), which in turn is press-fitted onto an axle 18, will experience a shear stress on it when an axle torque is being applied and its circular polarization will change to an elliptical polarization. Prior to the applied torque, the ring's 24 circular polarization does not sustain any axial magnetic field and generates circumferential magnetic flux lines M that are contained within the ring 24. Referring to FIG. 9B, as soon as the axle torque is applied, the ring polarization changes from circular to elliptical. The induced elliptical polarization sustains an axial magnetic field within the ring 24 whose magnitude depends on the applied torque value and generates magnetic flux lines M that emanate from one side of the ring 24 and return back to it from its other side through the surrounding air. In other words, the ring's 24 sides form a magnetic pole pair. A magnetic sensor 30 such as a Hall effect sensor or a magnetoresistive sensor that is placed properly near the magnetoelastic ring 24 would sense the induced axial magnetic field and provide a measure of the applied axle torque. In certain applications where high torque sensitivity and accuracy are required, more than one ring/sensor configuration could be implemented inside the bearing in order to reduce the effect that axle loads and moments could have on the torque measurement. In this configuration the magnetoelastic ring would be oppositely polarized as shown by the arrows +M and −M in FIGS. 10A and 10B.

In the following in-bearing sensor assemblies, the use of a sensor implies either an EC sensor or a magnetic sensor unless it is otherwise stated. Also an EC sensor is coupled to a non-magnetized ring, and a magnetic sensor to a circularly polarized ring.

Figure 11A:
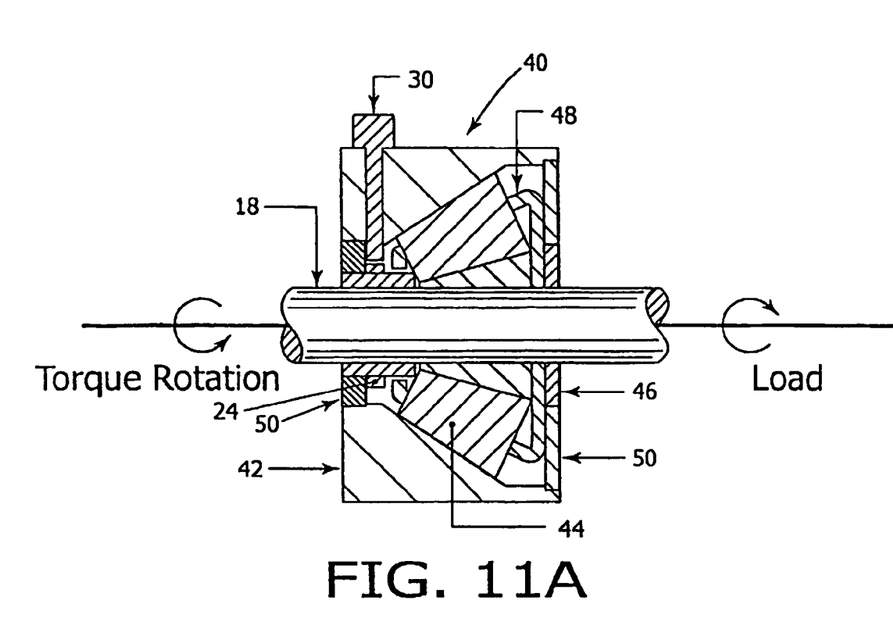
FIGS. 11A and 11B are side views of a bearing with either one or more single point eddy current sensors or with one or more single point magnetic field sensors according to an embodiment of the present invention.
Figure 11B:
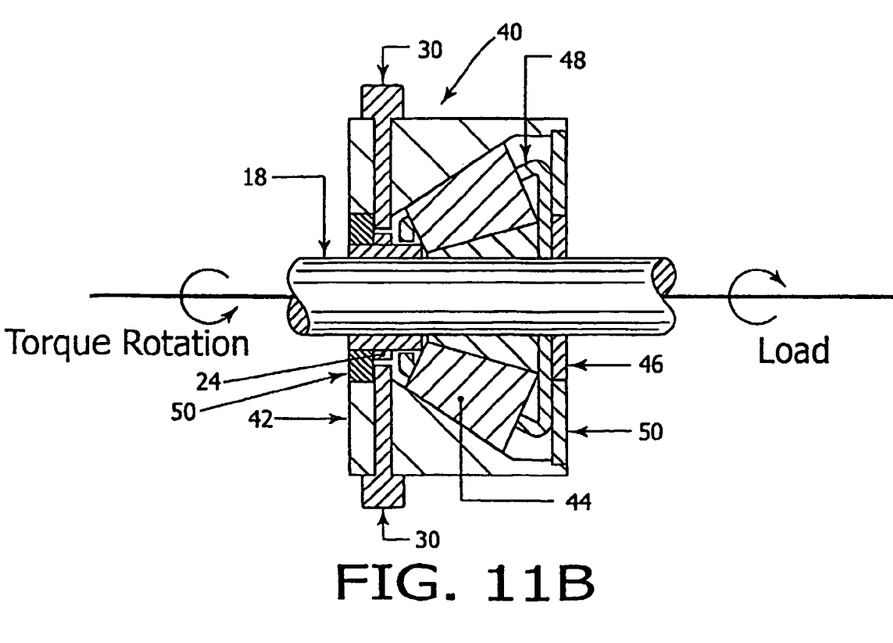

Referring to FIGS. 11A and 11B, a single-row bearing assembly 40 having a cup 42 (or outer race), rollers 44, cone 46 (or inner race), roller cage 48 and bearing seals 50 is shown with a magnetoelastic ring 24 is press-fit onto the smaller diameter of the cone, with the cone 46 having been press-fit onto the shaft 18. One or more sensors 30 are placed in one or more through-holes in the bearing cup 42. The magnetoelastic ring 24 and sensor 30 could be mounted on either side of the bearing seal 50, if it is incorporated in the bearing design. In the design of FIGS. 11A and 11B, the sensors 30 may be absolute or differential sensors. Moreover, when differential sensors 30 are used, the single magnetoelastic ring 24 may be replaced with a pair of magnetoelastic rings 24 that may or may not be knurled.

Figure 12A:
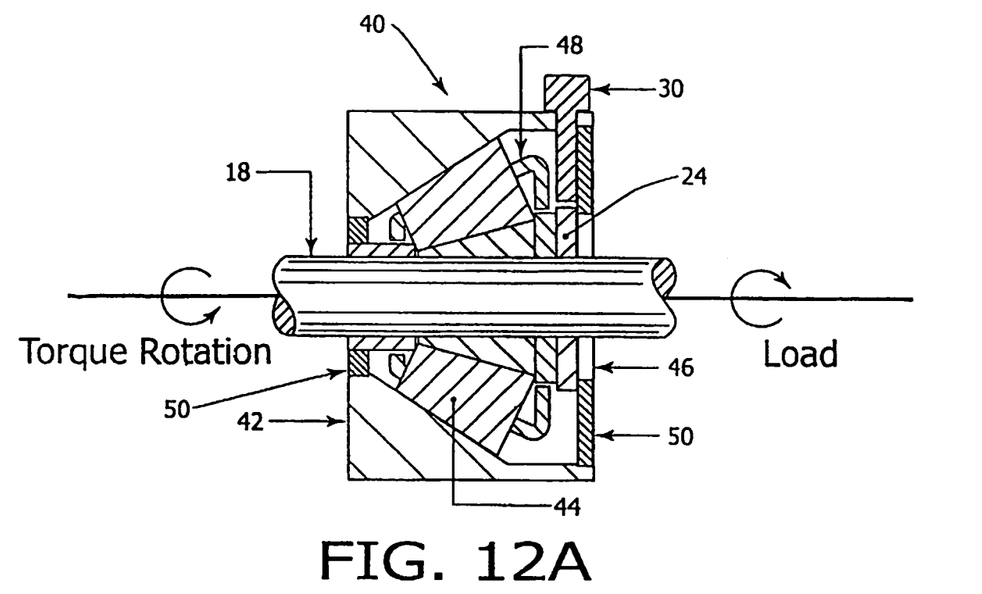
FIGS. 12A and 12B are side views of a bearing with either one or more single point eddy current sensors or with one or more single point magnetic field sensors according to an embodiment of the present invention.
Figure 12B:
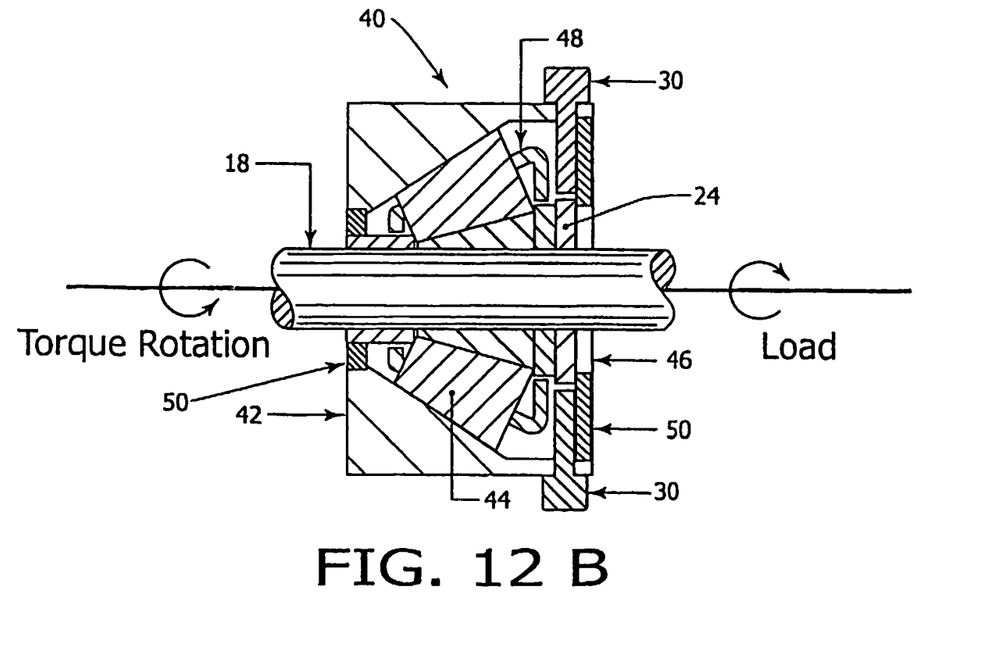

Referring to FIGS. 12A and 12B, the bearing assembly 40 including the cup 42, rollers 44, cone 46, roller cage 48 and bearing seals 50 may be provided with the magnetoelastic ring 24 is press-fit onto the large diameter of the cone, with the cone 46 having been press-fit onto the shaft 18. The magnetoelastic ring 24 and sensor 30 could be mounted on either side of the bearing seal 50, if it is incorporated in the bearing design. In the design of FIGS. 12A and 12B, the sensors 30 may be absolute or differential sensors. Moreover, when differential sensors 30 are used, the single magnetoelastic ring 24 may be replaced with a pair of magnetoelastic rings 24 that may or may not be knurled.

Figure 13:
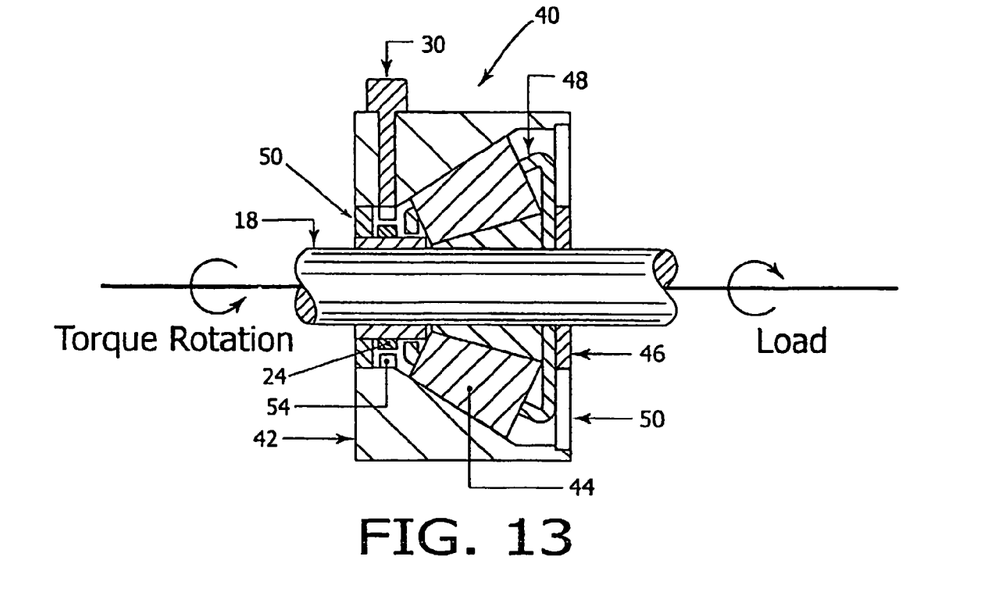
FIG. 13 is a side view of a bearing with an encircle coil eddy current sensor according to an embodiment of the present invention.
Figure 14:
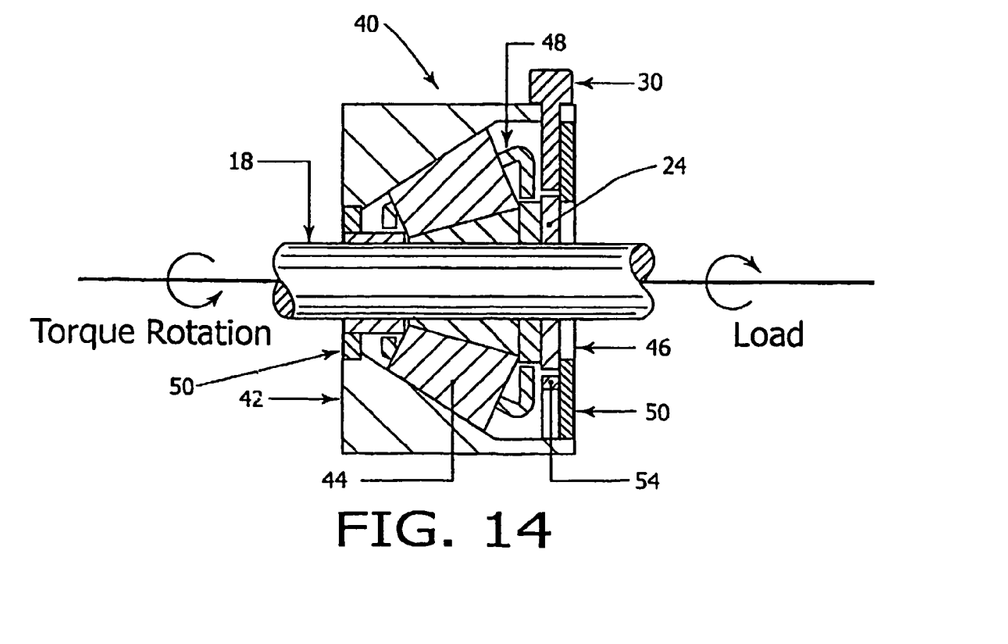
FIG. 14 is a side view of a bearing with an encircle coil eddy current sensor according to an embodiment of the present invention.

Referring to FIG. 13, the bearing assembly 40 including the cup 42, rollers 44, cone 46, roller cage 48 and bearing seals 50 and is provided with the magnetoelastic ring 24 is press-fit onto the small diameter of the cone 46, with the cone 46 having been press-fit onto the shaft 18. The sensor 54 takes the form of an encircle-coil EC sensor that is not attached through a through hole in the cup 42, but rather is attached to an inside diameter of the cup 42 and electrically connected to the sensor connector 30. Referring to FIG. 14, the design of FIG. 13 may be altered such that the magnetoelastic ring is press-fit onto the large diameter of the cone 46 and the sensor connector 30 and the encircle-coil EC sensor 54 are installed into the cup 42 over the magnetoelastic ring 24. The EC sensor 54 of FIGS. 13 and 14 may be an absolute or a differential EC sensor. If the EC sensor 54 is a differential sensor, the magnetoelastic ring 24 may be replaced with a pair of magnetoelastic rings 24 that may or may not be knurled.

Figure 15:
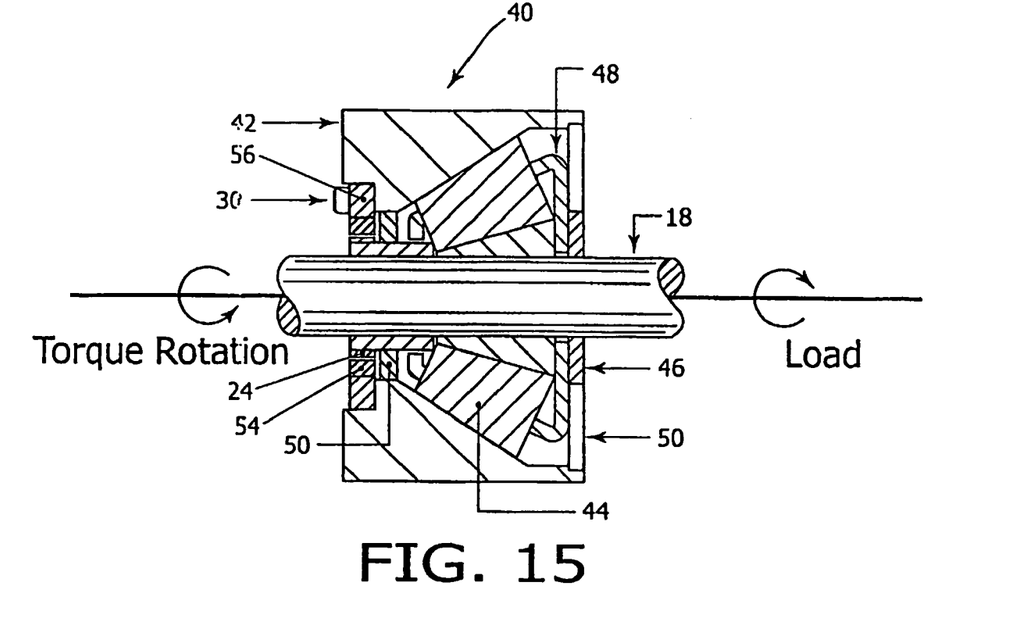
FIG. 15 is a side view of a bearing with an encircle coil eddy current sensor according to an embodiment of the present invention.
Figure 16:
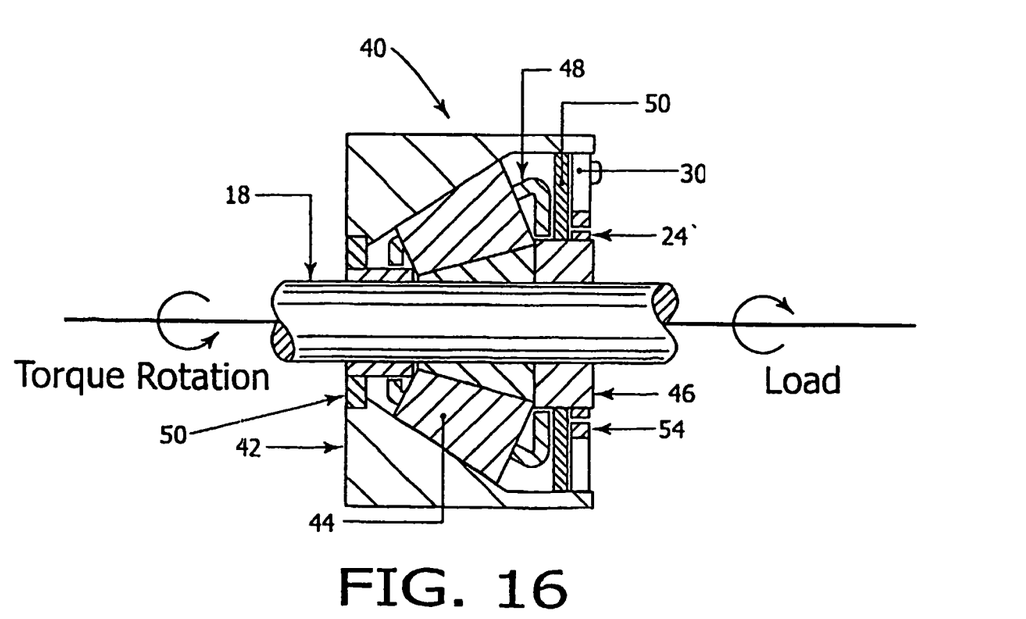
FIG. 16 is a side view of a bearing with an encircle coil eddy current sensor according to an embodiment of the present invention.

Referring to FIG. 15, the bearing assembly 40 including the cup 42, rollers 44, cone 46, roller cage 48 and bearing seals 50 and is provided with the magnetoelastic ring 24 is press-fit onto the small diameter of the cone 46, with the cone 46 having been press-fit onto the shaft 18. An encircle-coil EC sensor 54 is mounted to the cup 42, not through a through-hole within the cup 42, but rather to a counterbore 56 within the cup 42. The encircle-coil EC sensor 54 within the counterbore 56 is electrically connected to the sensor connector 30. The electrical connection from the sensor 54 exits the bearing assembly 40 either axially from a connector 30 located on the sensor outer side between the bearing cup 42 and bearing cone 46 or through a radial groove on the side of the cup 42. Referring to FIG. 16, the magnetoelastic ring 24 can be press-fit onto the large diameter of the cone 46 and the encircle-coil EC sensor 54 attaches to an inside diameter of the cup 42 over the magnetoelastic ring 24. The magnetoelastic ring 24 and sensor connector 30 are mounted on the outer side of the bearing seal 50 if it is incorporated in the bearing design. Once again, the sensor 54 may be an absolute or a differential sensor, the magnetoelastic ring 24 may be a pair of magnetoelastic rings and the ring(s) 24 may be knurled.

Figure 17:
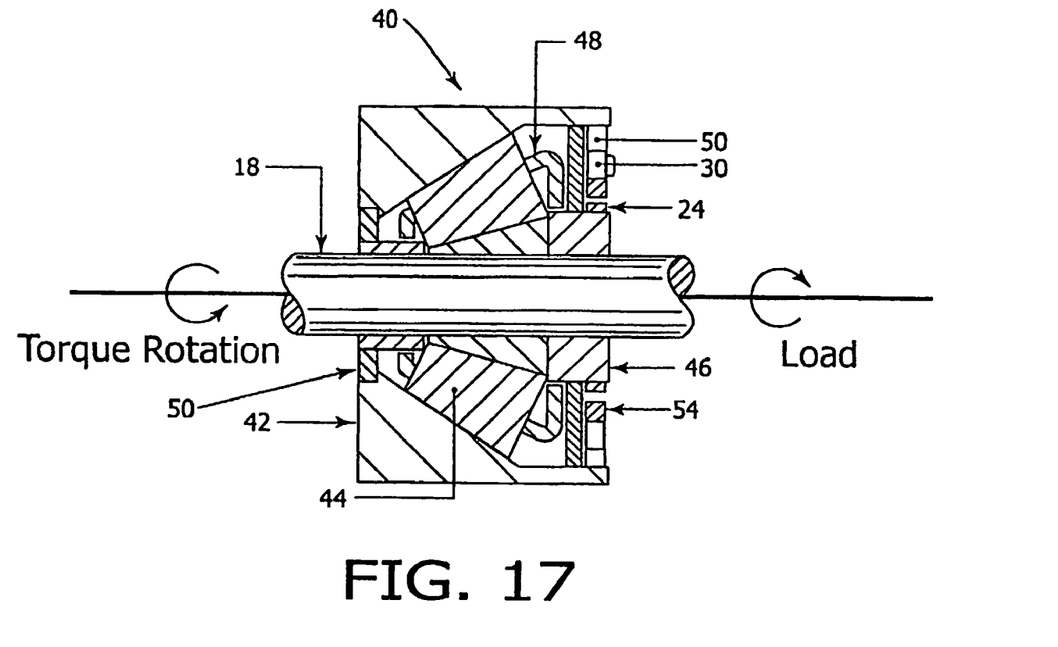
FIG. 17 is a side view of a bearing with an encircle coil eddy current sensor according to an embodiment of the present invention.

Referring to FIG. 17, the design of FIGS. 15 and 16 may be altered so that the encircle-coil EC sensor 54 mounts within a counterbore in the seal 50. Furthermore, it should be appreciated one of ordinary skill in the art that while the present invention has been described with respect to single-row bearings and tapered bearings that the concepts of the present invention also apply to multiple row bearings and bearings with rolling elements other than tapered rollers (such as ball bearings).

While the specific embodiments have been illustrated and described, numerous modifications come to mind without significantly departing from the spirit of the invention, and the scope of protection is only limited by the scope of the accompanying claims.

The invention claimed is:

1. A device for sensing a torque applied through a shaft, the device comprising:
    a bearing attached to the shaft comprising an inner race rotationally fixed to the shaft, a stationary outer race and a plurality of rolling elements disposed between the inner and outer races;
    a magnetoelastic ring press-fit onto the inner race;
    an excitation coil placed in operative proximity to the magnetoelastic ring for inducing eddy currents within said magnetoelastic ring;
    a sensing coil placed in operative proximity to the magnetoelastic ring, said sensing coil sensing a magnetic field generated by said induced eddy currents within said magnetoelastic ring;
    an electric circuit operatively coupled to the sensing coil for sensing a change in electrical conductivity and magnetic permeability of said magnetoelastic ring which is representative of a torque applied through the shaft in proximity to said sensing coil and inner race.

2. The device of claim 1 wherein the inner race is a tapered race and the magnetoelastic ring is press fit upon a journal adjacent a small end of the tapered inner race.

3. The device of claim 1 wherein the inner race is a tapered race and the magnetoelastic ring is press fit upon a journal adjacent a large end of the tapered inner race.

4. The device of claim 1 wherein the excitation coil and sensing coil are packaged into a single unit mounted to the outer race.

5. The device of claim 4 wherein the single unit is mounted within a radial bore of the outer race.

6. The device of claim 5 further comprising a second excitation coil and second sensing coil packaged into a second unit mounted to the outer race.

7. The device of claim 6 wherein the second unit is mounted to the outer race opposite the single unit.

8. The device of claim 4 wherein the single unit is mounted within a counterbore of the outer race.

9. The device of claim 4 wherein the single unit is mounted within a seal mounted within the outer race.

10. The device of claim 4 further comprising a second excitation coil and second sensing coil attached to the outer race opposite the single unit and electrically connected to the single unit.

11. The device of claim 1 wherein the electrical circuit comprises:
    a bridge balancing circuit that receives an output of the sensing coil;

an amplifier for amplifying the output of the bridge balancing circuit a demodulator for demodulating the output of the amplifier; and a filter that filters the output of the demodulator to generate a sensor output representative of a torque applied through the shaft in proximity to said sensing coil and inner race.

12. The device of claim 11 further comprising:

a second excitation coil; and a second sensing coil, wherein the first and second sensing coils generate signals of approximately equal amplitude and opposite phase.

13. The device of claim 12 further wherein:

the first of the excitation and sensing coils are rotated at +45 degrees from an axis defined by a center axis of the shaft so as to focus on a line of compression or tension of the magnetoelastic ring;

the second of the excitation and sensing coils are rotated at −45 degrees from the axis defined by the center axis of the shaft so as to focus on an opposite of the line of compression or tension focused upon by the first of the excitation and sensing coils.

14. The device of claim 13 wherein the magnetoelastic ring is divided into a first and a second magnetoelastic ring, the first magnetoelastic ring having the first excitation and sensing coils focused upon it and the second magnetoelastic ring having the second excitation and sensing coils focused upon it.

15. The device of claim 13 wherein the first and second excitation coils are spaced apart 180 degrees along the circumference of the ring.

16. The device of claim 13 wherein the first and second excitation and sensing coils are incorporated into a single physical package.

17. The device of claim 13 wherein the magnetoelastic ring has knurled grooves over its outside diameter.

18. The device of claim 17 wherein the knurled grooves nearest the first excitation and sensing coils are disposed at +45 degrees from the axis defined by the center axis of the shaft and the knurled grooves nearest the second excitation and sensing coils are disposed at −45 degrees from the axis defined by the center axis of the shaft, such that the knurled grooves are parallel to the lines of tension and compression of the magnetoelastic ring.

19. The device of claim 13 further comprising third and fourth excitation coils and third and fourth sensing coils, the third sensing and excitation coils focused on one of a line of compression or tension of the magnetoelastic ring and the fourth sensing and excitation coils focusing on the other of the line of tension or compression of the magnetoelastic ring.

20. A bearing assembly for sensing a torque applied through a shaft, the device comprising:

a bearing coaxially attached to the shaft comprising an inner race rotationally fixed to the shaft, an outer race secured stationary relative to the shaft and a plurality of rolling elements disposed between said inner and outer races;

a magnetoelastic circularly polarized ring press-fit onto the bearing inner race;

a sensor coupled to the outer race of said bearing for sensing torque induced changes in an axial magnetic field associated with said magnetoelastic ring on said bearing inner race; and an electric circuit that receives an output of the sensor and correlates the sensor output to the torque applied through the shaft in proximity to the bearing inner race.

21. The device of claim 20 wherein the inner race is a tapered race and the magnetoelastic ring is press fit upon a journal adjacent a small end of the tapered inner race.

22. The device of claim 20 wherein the inner race is a tapered race and the magnetoelastic ring is press fit upon a journal adjacent a large end of the tapered inner race.

23. The device of claim 20 wherein the sensor comprises an excitation coil and sensing coil that are packaged into a single unit mounted to the bearing outer race.

24. The device of claim 23 wherein the single unit is mounted within a radial bore of the bearing outer race.

25. The device of claim 24 further comprising a second magnetoelastic circularly polarized ring press-fit onto the bearing inner race, and a second excitation coil and second sensing coil packaged into a second unit mounted to the bearing outer race, said second magnetoelastic ring and said second sensing unit axially displaced from said first ring and said first sensing unit.

26. The device of claim 23 wherein the single unit is mounted within a counterbore of the bearing outer race.

27. The device of claim 23 wherein the single unit is mounted within a seal mounted within the bearing outer race.

28. The device of claim 20 wherein the sensor is a hall effect sensor.

29. The device of claim 20 wherein the sensor is a magnetoresistive sensor.

* * * * *